United States Patent [19]

McGuth et al.

[11] 4,199,010
[45] Apr. 22, 1980

[54] CERAMIC LINED CONDUIT

[75] Inventors: Joseph C. McGuth, Chatham; Edwin J. Przetak, Wayne, both of N.J.

[73] Assignee: Foster Wheeler Energy Corporation, Livingston, N.J.

[21] Appl. No.: 911,859

[22] Filed: Jun. 2, 1978

[51] Int. Cl.² ............................................. F16L 9/14
[52] U.S. Cl. ..................................... 138/140; 138/155; 138/DIG. 6
[58] Field of Search ............... 138/140, DIG. 6, 149, 138/143, 175, 155, 109, 101

[56] References Cited

U.S. PATENT DOCUMENTS

| | | | |
|---|---|---|---|
| 1,871,508 | 8/1932 | Gardner | 138/DIG. 6 |
| 2,006,226 | 6/1935 | Yaxley | 138/DIG. 6 |
| 2,331,644 | 10/1943 | Altorfer et al. | 138/149 |
| 2,745,437 | 5/1956 | Comstock | 138/140 |
| 3,516,447 | 6/1970 | Pittman | 138/140 |

Primary Examiner—Lenard A. Footland
Attorney, Agent, or Firm—Marvin A. Naigur; John E. Wilson; John J. Herguth, Jr.

[57] ABSTRACT

A conduit used to convey particulate matter in which erosion is substantially diminished. A liner placed within the outer wall of the conduit is of ceramic material which is highly resistant to erosion.

4 Claims, 4 Drawing Figures

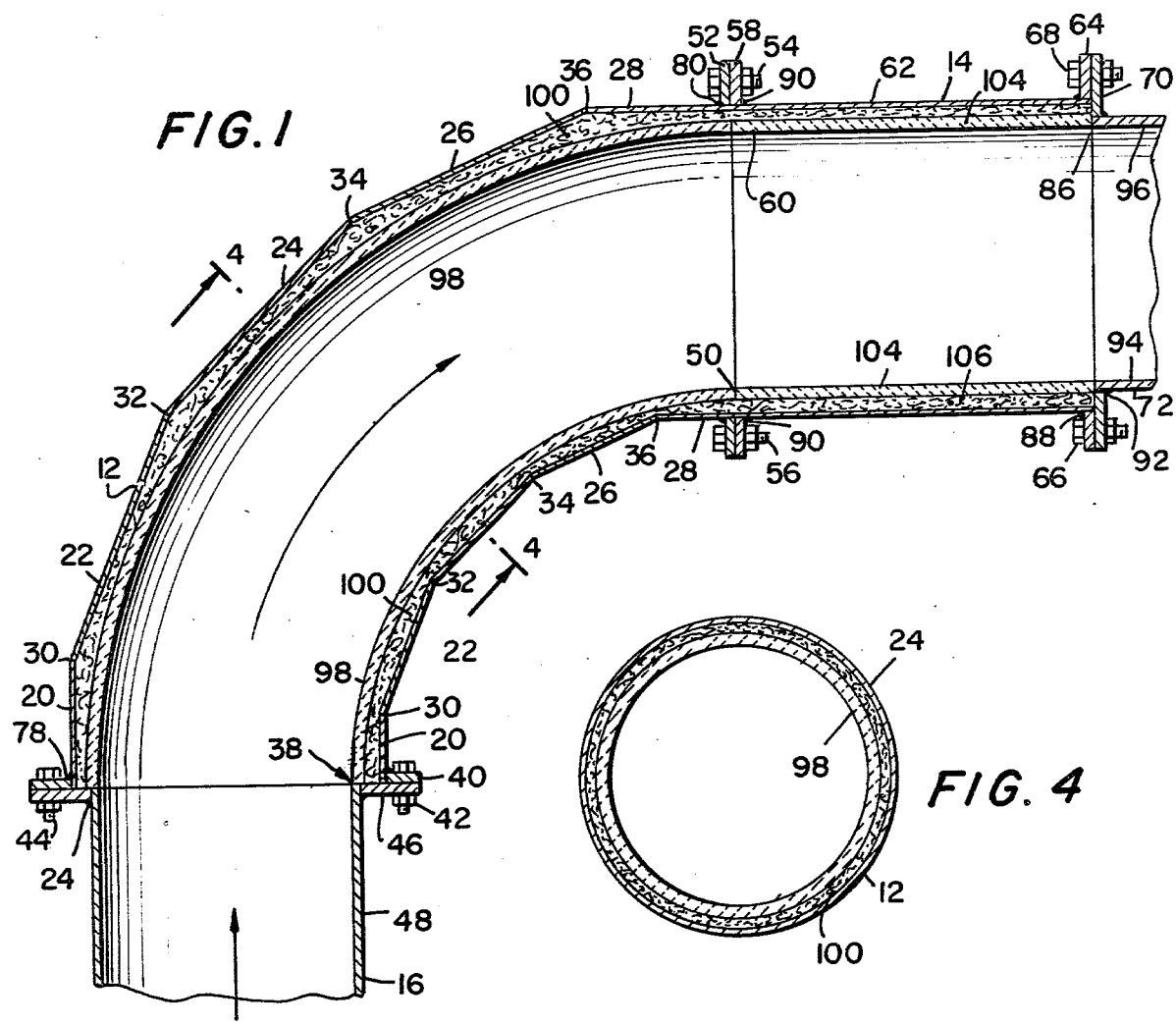
FIG. 1
FIG. 4
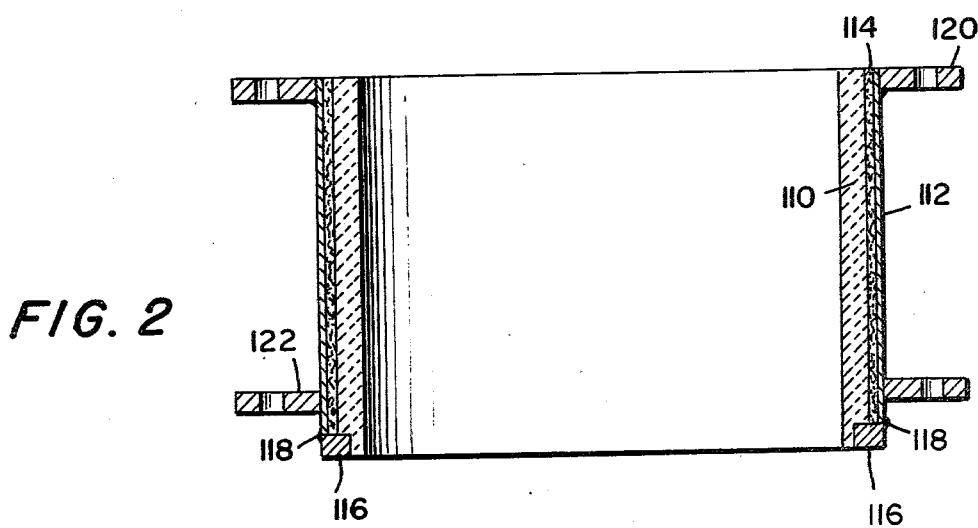
FIG. 2

CERAMIC LINED CONDUIT

BACKGROUND OF THE INVENTION

There are certain industrial applications where conduits are used to carry solid material such as pulverized coal. In such conduits erosion is a problem where the solids are abrasive. For example, when pulverized coal is conveyed through a conduit, erosion can be excessive when certain kinds of coal are used.

The entire wall of a solids conveying conduit is susceptible to erosion. Certain portions of the conduit, however, are more susceptible to erosion than others. Where the conduit curves, the abrasive solids tend to erode the outer periphery of the curve because they impinge against the conduit at that location.

Use of a conduit over a period of years to convey abrasive solids will actually wear holes through the side wall of the conduit. This will cause a loss of material. Further, it makes for a dirty environment for the workers and can create an unsafe condition. For example, in a power plant where pulverized coal is conveyed through a conduit and there is a hole through the side wall, coal dust will be ever present in the surrounding area creating a fire hazard and an unhealthy work area for the workers. In addition, considerable expense is incurred because of the constant clean-up operation which becomes necessary.

Attempts have been made to prevent further leakage once the side wall of a conduit fails. Plates have been welded in place or held against the leaky conduit by bands passing over the plate and around the conduit. Such attempts have not been satisfactory for several reasons. For one, crevices between the plate and conduit are present and allow some of the solid material to leak out. Further, such repairs result in an inner wall which is not smooth and which is therefore more susceptible to erosion than a conduit which has not been repaired. Because it is expensive to replace conduits and the plates tend to wear more quickly than the unpatched portion of the conduit, it is not uncommon for a plate used to patch a conduit to fail because a hole wears through it. Additional plates are then applied to the leaking plates in an attempt to prevent for a time further leakage of solid material. This creates an even more irregular inner surface; and therefore, the additional plates prevent leakage for a shorter time than do the original plates.

Patching leaky conduits with plates is also unsatisfactory because the conduits tend to vibrate; and therefore, the plates will tend to loosen and have to be tightened or welded from time to time if they are to have any substantial effect in preventing leakage of solids.

SUMMARY OF THE INVENTION

It is an object of the present invention to overcome drawbacks found in the prior art such as those discussed above. Accordingly, a circular duct used to convey solids is provided with a circular liner of a ceramic material to prevent erosion.

BRIEF DESCRIPTION OF DRAWINGS

FIG. 1 is a view partly in section showing a curved segment and an adjacent straight section of a duct made in accordance with the present invention as well as an adjacent section of conventional duct;

FIG. 2 is a view partly in section of a straight segment of duct made in accordance with the present invention;

FIG. 4 is a view taken substantially along the line 4—4 of FIG. 1.

DETAILED DESCRIPTION OF PREFERRED EMBODIMENT

Figure 3:
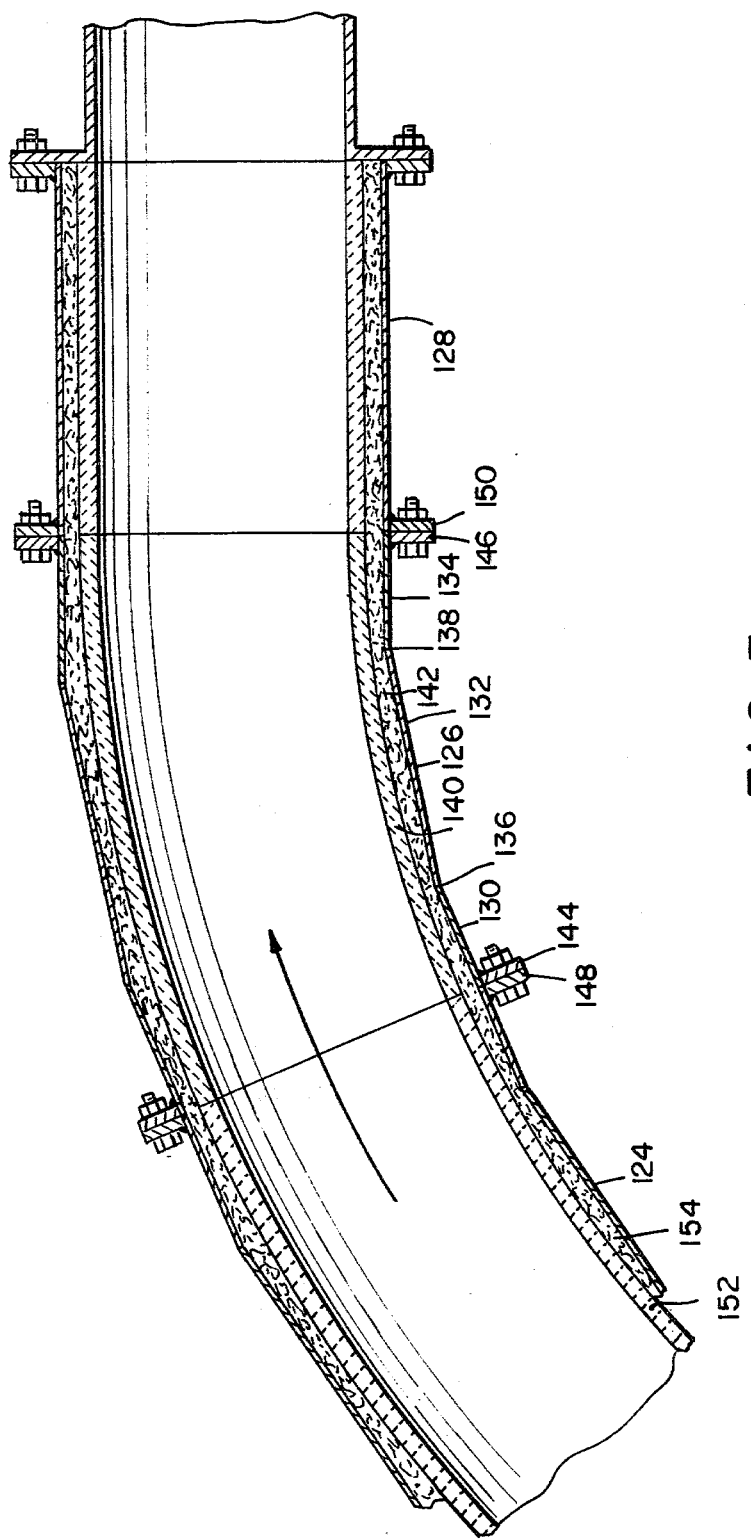
FIG. 3 is a view partly in section showing several curved sections and one straight section of duct made in accordance with the present invention as well as a portion of a conventional adjacent straight section.

As shown in FIG. 1 a curved section 12 of duct is placed between a straight section 14 and a straight section 16. The sections 12 and 14 are each made in accordance with the present invention whereas the section 16 is conventional in design. The section 12 has an outer wall 18 which is circular in cross section as shown in FIG. 4. It is made up of a series of segments 20, 22, 24, 26 and 28. The segments 20–28 are each separated from contiguous segments by a number of angular breaks 30, 32, 34 and 36 in the outer wall 18. Each of the segments 20–28 is straight, that is, its longitudinal axis is straight and any plane containing the longitudinal axis of a segment will intersect the side walls of the segment in straight lines.

At one end 38 of the curved section 12, the segment 20 is connected at the end thereof farthest from the section 14 to an annular flange 40 which can be bolted by bolts 42 and 44 to a flange 46 which extends angularly outward from a side wall 48 of the straight section 16 which may be of conventional design as illustrated.

At the other end 50 of the curved section 12, the segment 28 at the end thereof farthest from the section 16 is an annular flange 52 which may be bolted by bolts 54 and 56 to a flange 58 on one end 60 of the straight section 14.

The straight section 14 is generally cylindrical having a cylindrical outer wall 62 which extends to an annular flange 64 which may be bolted by bolts 66 and 68 to an annular flange 70 at the end of a conventional straight section 72. The flange 46 is welded at 74 to the side wall of the straight section 16. Similarly, the flange 40 is welded at 78 to the segment 20 of the curved section 12 and the flange 52 is welded at 80 to the segment 28 of the curved section 12. The flange 64 which is located at an end 86 of the section 14 is welded at 88 to the outer wall 62 and the flange 58 is welded at 90 at the end 60 of the straight section 16 to the outer wall 62 thereof.

The flange 70 is welded at 92 to a side wall 94 of a conventional straight duct section 96. Thus, when the bolts 66 and 68 are tightened in their respective nuts as shown, the flanges 64 and 70 are clasped together to bring the sections 96 and 14 into tight engagement. Similarly, when the bolts 42, 44, 54 and 56 are tightened, the section 12 is brought into tight abutting engagement with the adjacent sections 16 and 14.

It has been explained how when pulverized material is conveyed through duct work, erosion will be a concomitant problem. This will be especially true at locations where the duct curves. Thus, pulverized material moving in the direction of the arrows in FIG. 1 will cause erosion within the curved section 12 since the flow of the pulverized material will not be laminar. Immediately after passing through the curved section 12, the adjacent downstream section 14 can be expected to experience some erosion. For this reason, the sections 12 and 14 are not conventional as are the sections 16 and 96 but are provided with means to substantially eliminate erosion. To this end the curved section 12 is provided with a liner 98 of ceramic material. The ceramic liner is monolithic and may consist of nitride-bonded silicon carbide. A ceramic such as nitride-bonded silicon carbide resists abrasion more than liners made of common metals. A ceramic liner has a low co-efficient of thermal expansion and will not soften substantially at elevated temperatures. Further, a ceramic liner can be casted so that it is possible to form it into almost any shape in liners which can be accurately positioned within a duct section.

The liner 98 is circular in cross section as shown best, perhaps, in FIG. 4. The liner 98 is held in place by a refractory filler material 100 which may be concrete. The filler material 100 will also prevent the liner 98 from being strained in tension no matter what force is exerted on the liner 98 by the pulverized material flowing within the liner.

The straight section 14 contains a ceramic liner 104 which is monolithic. The liner 104 is circular in cross section and coaxially positioned with the outer wall 62 of the straight section 14. Refractory filler material 106 between the liner 104 and the outer wall 62 of the straight section 14 holds the liner 104 in place and prevents forces within the liner 104 from resolving into tension stresses regardless of the amplitude or direction of forces exerted on the line 104 from within.

There are applications where comparatively short sections of conduit are susceptible to excessive erosion. Further, a section of conduit may not be adapted to be connected to one which will abut against the liner. Thus, it may be desirable to design such a section so that the liner will be held in place without relying on the adjacent section to support the liner. Such a section is shown in FIG. 2 where a liner 110 is coaxially positioned within outer wall 112. Refractory filler material 114 is positioned within the conduit section between the outer wall and the liner 110 to perform the same function as the filler material described in the duct work of FIG. 1. An annular holding ring 116 is welded at 118 to the outer wall 112. In the event that the section of FIG. 2 is vertically positioned as shown, even if the liner 110 were to erode so that its inside diameter should be substantially increased, it would be retained in place by the holding ring 116. Flanges 120 and 122 are provided so that the section can be properly mounted.

It is possible to place several curved sections in tandem if necessary. Such an arrangement is shown in FIG. 3 where curved sections 124 and 126 are fastened end to end. Section 126 is secured at its end to straight section 128 which along with sections 124 and 126 is made in accordance with the present invention. Section 124 is not shown in its entirety but it is made up of three segments. Similarly, section 126 is made up of three segments 130, 132 and 134. The segments 130 and 132 are separated by an angular break 136 and the segments 132 and 134 are separated by an angular break 138.

A circular ceramic liner 140 is monolithic and is held in place by refractory filler material 142 placed between the liner 140 and the outer wall of the straight section 128. The straight section 128 has at its ends flanges 144 and 146 which are bolted to adjacent abutting flanges 148 and 150 respectively. Tightening bolts threaded through the flanges holds the section 126 in tight abutting engagement with the adjacent sections 124 and 128. The section 124 has a ceramic liner 152 which is held in end to end engagement with the liner 140. The liner 152 is held in place by refractory filler material 154.

The curved duct sections of FIG. 3 are essentially similar to section 12 shown in FIG. 1, except that the sections 124 and 126 have a greater radius of curvature and may differ in other dimensions.

The section 128 is substantially similar to the straight section 14 of FIG. 1 differing only possibly in dimension; and therefore, will not be described in detail.

Abrasive material being conveyed through the conduit of FIG. 3 in the direction of the arrows would erode the conduit at the curve excessively except for the fact that the conduit was provided with ceramic liners at the curve.

The foregoing describes but one preferred embodiment of the present inventions. Other embodiments being impossible without exceeding the scope thereof as defined in the following claims.

What is claimed is:

1. A curved section of conduit for conveying particulate matter of an erosive nature comprising;
   an outer wall circular in cross section having a flange at one end thereof, said flange being adapted to be secured to the flange of an adjacent conduit section;
   a monolithic liner of nitride-bonded silicon carbide, said liner being circular in cross section and positioned coaxially within said outer wall; and
   refractory filler material positioned between said outer wall and said liner.

2. A section of conduit for conveying particulate matter of an erosive nature comprising;
   an outer wall circular in cross section;
   a monolithic ceramic liner, said liner being circular in cross section, positioned coaxially within and being co-extensive with said outer wall, said liner having an angular recess;
   refractory filler material positioned between said outer wall and said ceramic liner; and
   an annular holding ring affixed to said outer wall and extending inward beyond said refractory filler material and into said recess.

3. The section of conduit defined in claim 2 wherein said curved section consists of a number of integral segments separated by angular breaks in said outer wall.

4. The section of conduit defined in claim 2 wherein said section extends at an angle to the horizontal, said holding ring is at the lower end of said conduit and said recess is at the lower end of said ceramic liner.

* * * * *